(12) United States Patent
Loh et al.

(10) Patent No.: US 10,774,618 B2
(45) Date of Patent: Sep. 15, 2020

(54) AUTONOMOUS DOWNHOLE POWER GENERATOR MODULE

(71) Applicants: Yuh Loh, Cypress, TX (US); Zhi Yong He, Cypress, TX (US); Lily Truong, Spring, TX (US); Felipe Rivero, Humble, TX (US); Zhiyue Xu, Cypress, TX (US)

(72) Inventors: Yuh Loh, Cypress, TX (US); Zhi Yong He, Cypress, TX (US); Lily Truong, Spring, TX (US); Felipe Rivero, Humble, TX (US); Zhiyue Xu, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 74 days.

(21) Appl. No.: 15/923,739

(22) Filed: Mar. 16, 2018

(65) Prior Publication Data
US 2019/0284907 A1  Sep. 19, 2019

(51) Int. Cl.
*E21B 41/00* (2006.01)
*H02N 1/04* (2006.01)

(52) U.S. Cl.
CPC .......... *E21B 41/0085* (2013.01); *H02N 1/04* (2013.01)

(58) Field of Classification Search
CPC ................ E21B 41/0085; H02N 1/04
See application file for complete search history.

(56) References Cited

U.S. PATENT DOCUMENTS

| | | | | |
|---|---|---|---|---|
| 4,491,738 A * | 1/1985 | Kamp | ................ | E21B 41/0085 290/43 |
| 5,839,508 A * | 11/1998 | Tubel | ................ | E21B 41/0085 166/65.1 |
| 6,670,880 B1 * | 12/2003 | Hall | ...................... | E21B 17/028 336/132 |
| 7,165,608 B2 * | 1/2007 | Schultz | ............... | E21B 41/0085 166/66.5 |
| 7,190,084 B2 * | 3/2007 | Hall | .................... | E21B 41/0085 290/1 R |
| 7,199,480 B2 * | 4/2007 | Fripp | ................. | E21B 41/0085 290/1 R |
| 7,246,660 B2 * | 7/2007 | Fripp | ................. | E21B 41/0085 166/65.1 |
| 8,916,983 B2 * | 12/2014 | Marya | .................... | F03B 13/02 290/43 |
| 9,130,161 B2 * | 9/2015 | Nair | ...................... | H01L 41/125 |
| 9,790,928 B2 * | 10/2017 | Wang | ..................... | G01L 1/005 |

(Continued)

*Primary Examiner* — Blake E Michener
(74) *Attorney, Agent, or Firm* — Sprinkle IP Law Group (57) ABSTRACT

A downhole power generator module having a body with one or more couplings that are configured to connect the body to a downhole tool string positioned downhole in a wellbore. An axial passageway is formed through the outer housing and couplings. The power generator module has a pressure-driven electric generator such as a triboelectric or piezoelectric generator positioned within the body. A port in the body enables communication of well fluids from the wellbore to the generator. Pressure changes in the well fluids are communicated to the pressure-driven electric generator, causing it to autonomously generate electric power downhole. The generated power is provided directly to other downhole tools without intervention from the surface.

10 Claims, 6 Drawing Sheets

(56) References Cited

U.S. PATENT DOCUMENTS

| | | | | |
|---|---|---|---|---|
| 10,044,244 B2* | 8/2018 | Downing | E21B 41/0085 | |
| 10,082,004 B2* | 9/2018 | Merlau | E21B 41/0085 | |
| 2002/0096887 A1* | 7/2002 | Schultz | E21B 28/00 | 290/54 |
| 2005/0051323 A1* | 3/2005 | Fripp | E21B 41/0085 | 166/65.1 |
| 2006/0086498 A1* | 4/2006 | Wetzel | E21B 41/0085 | 166/250.12 |
| 2007/0194948 A1* | 8/2007 | Hall | E21B 17/003 | 340/854.8 |
| 2009/0133867 A1* | 5/2009 | Kuckes | E21B 41/0085 | 166/65.1 |
| 2009/0236149 A1* | 9/2009 | Main | E21B 4/006 | 175/104 |
| 2011/0057449 A1* | 3/2011 | Marya | F03B 13/02 | 290/54 |
| 2012/0319409 A1* | 12/2012 | Schoonover | E21B 41/0085 | 290/1 R |
| 2013/0153242 A1* | 6/2013 | Flight | E21B 33/0355 | 166/363 |
| 2014/0069639 A1* | 3/2014 | Mackenzie | E21B 23/14 | 166/250.01 |
| 2014/0246951 A1* | 9/2014 | Wang | H02N 1/04 | 310/310 |
| 2014/0292138 A1* | 10/2014 | Wang | H02N 1/04 | 310/300 |
| 2015/0035408 A1* | 2/2015 | Despesse | H02N 1/08 | 310/310 |
| 2016/0218640 A1* | 7/2016 | Wang | H02N 1/04 | |
| 2016/0315561 A1* | 10/2016 | Shin | H02N 1/04 | |
| 2017/0331396 A1* | 11/2017 | Byun | H02N 1/04 | |
| 2018/0262126 A1* | 9/2018 | Gooneratne | H02N 1/04 | |
| 2018/0262127 A1* | 9/2018 | Gooneratne | H02N 1/04 | |
| 2019/0242213 A1* | 8/2019 | Hunter | H02N 1/04 | |

* cited by examiner

AUTONOMOUS DOWNHOLE POWER GENERATOR MODULE

BACKGROUND

Field of the Invention

The invention relates generally to systems and methods for providing local power to electrical equipment that is positioned downhole in a well, and more particularly to for systems and methods for generating power at a position downhole in the well, where the power is generated autonomously from changes in local conditions such as pressure, and where the power is provided to other equipment that is also positioned downhole without requiring intervention from the surface.

Related Art

The production of oil from wells involves the use of many different types of tools. These tools often require electrical power which has to be supplied from equipment positioned at the surface of the well. For instance, an electric submersible pump (ESP) may require power that is provided by an electric drive which is at the surface. The ESP may also include gauges, sensors and the like which are dependent upon the ESP, and therefore the drive at the surface of the well, for power that they need to operate. Many other types of downhole equipment (e.g., valves, sensors, gauges, controls, etc.) are similarly dependent upon power sources that are located at the surface of the well.

"Downhole" equipment, or tools, as used herein, is equipment that is positioned within the borehole of a well. Commonly, downhole equipment is installed in wells that are thousands of feet deep. If the downhole equipment relies on power from the surface of these wells, the power must be carried by an electrical cable that extends from the surface to the respective piece of downhole equipment. The design of the system must therefore obviously take into account the various components required for power transmission from the surface to the downhole equipment. Further, the power that is supplied to the downhole equipment is subject to interruptions due to problems arising in these components, which include surface equipment, the power cable, various splices and connectors, etc. It would be desirable to be able to reduce or eliminate the design complications and potential points of failure resulting from the transmission of power from the surface to equipment that is positioned downhole in a well.

SUMMARY OF THE INVENTION

This disclosure is directed to systems and methods for autonomously providing local power to electrical equipment that is positioned downhole in a well, where the power is generated as a result of changes in local conditions such as well fluid pressure, where the power is provided to other equipment that is also positioned downhole, and where the power is provided without requiring intervention from the surface.

One embodiment comprises a downhole power generator module having a body with one or more couplings that are configured to connect the body to a downhole tool string positioned downhole in a wellbore. The couplings may be generally annular, threaded couplings positioned at opposing ends of an outer housing, where an axial passageway is formed through the outer housing and couplings. The power generator module has a pressure-driven electric generator positioned within the body and a port in the body that enables fluid communication of well fluids from the wellbore to the generator. Pressure changes in the well fluids are communicated to the pressure-driven electric generator, causing it to generate electric power.

In one embodiment, the downhole power generator module includes one or more AC-generating components and one or more rectifying components. AC power generated by the AC-generating components is provided to the rectifying components, which rectify the received AC power and produce DC output power. In one embodiment, the downhole power generator module has one or more pass-through terminals installed in the body, where conductors are coupled from the charging blocks to the pass-through terminals, and from the terminals to the rectifying components. The generator of the downhole power generator module may be electrically coupled to one or more downhole tools so that the DC output power produced by the generator is provided directly to the downhole tools without intervention by surface equipment. The downhole power generator module may also include an energy storage device such as a capacitor or battery which is coupled to receive the DC output power produced by the generator, in order to store the received energy, which can then be provided to the downhole tools.

In one embodiment, the generator comprises a triboelectric generator, although alternative embodiments may use other types of generators (e.g., a piezoelectric generator). The triboelectric generator has two sets of charging blocks, where a first set of the charging blocks is in contact with and movable with respect to a second set of the charging blocks. When the first set of the charging blocks moves with respect to the second set of the charging blocks, a voltage is developed between them, thereby producing an electric current. In one embodiment, the first set of the charging blocks is mounted on a first, stationary sleeve within the body and the second set of the charging blocks is mounted on a second, movable sleeve within the body.

The first and second sleeves are coaxial with the cylindrical outer housing, and the second, movable sleeve is positioned in an annulus between the first sleeve and the outer housing. A pressure chamber is located at a first end of the movable sleeve, where a fluid communication port enables fluid communication between the pressure chamber and a passageway through the outer housing and couplings. A spring is positioned at a second end of the movable sleeve opposite the pressure chamber, where the spring urges the movable sleeve toward the pressure chamber and wherein fluid pressure in the pressure chamber urges the movable sleeve toward the spring. Changes in the pressure of the well fluids thereby cause the second, movable sleeve and the second set of charging blocks to move with respect to the first, stationary sleeve and the first set of the charging blocks to produce a varying voltage.

In one embodiment, one of the sets of charging blocks is spring-mounted on the corresponding sleeve, so that they are urged against the other set of blocks in order to maintain contact between the sets of charging blocks. The charging blocks of one set are made of a material that produces positive charge (e.g., glass or nylon), and the other set of charging blocks are made of a material that produces negative charge (e.g., polytetrafluoroethylene). In one embodiment, the sets of charging blocks are configured as an array of individual charging blocks with two or more circumferentially oriented rows and two or more axially oriented columns.

In one embodiment, the downhole power generator module may be implemented as part of a system that includes a fluid injection pump. The downhole power generator module is connected to a downhole tool string and positioned downhole in a well. The downhole power generator module includes a body having one or more couplings that connect the body to the downhole tool string, a pressure-driven electric generator positioned within the body, and a port in the body that enables fluid communication between fluids in the wellbore and the pressure-driven electric generator. Injection of fluids into the well by the fluid injection pump cause pressure changes in the fluids in the well. These pressure changes in the fluids cause the pressure-driven electric generator to generate electric power. The electric power generated by the pressure-driven electric generator is then provided to one or more downhole tools in the downhole tool string without intervention from equipment at the surface of the well.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing local power to electrical equipment that is positioned downhole in a well, where the power is generated by a generating unit that is also positioned downhole in the well, and is configured to generate power locally and autonomously, and is then provided to the other downhole electrical equipment without intervention from equipment at the surface of the well.

One embodiment is a system that includes one or more electrically powered downhole tools and a downhole power generation module. The tools and the power generation module are coupled to each other so that power generated by the power generation module is provided directly to the tool. "Directly", as used here, refers to the fact that the power is transmitted from the power generation module to the tool without intervention from the surface. That is, the power is conveyed to the tool without having been generated at the surface of the well, and without the power being transmitted to the surface before being transmitted to the tool. In some instances, the power generation module may be connected to the downhole tool, so that only a set of relatively short, possibly internal conductors, are required to convey the power from the power generation module to the tool. In other cases, however, the power generation module and tool may not be directly connected to each other, so it may be necessary to provide power cables that extend from the downhole location of the power generation module and the downhole location of the tool. Power cables may be used to connect the power generation module to additional downhole tools as well. The set of tools that are coupled to the power generation module and are installed downhole in the well may be collectively referred to as a tool string.

In one embodiment, the power generation module is configured as a generally cylindrically shaped component having couplings on each end and a central passageway through it. The couplings allow the power generation module to be connected in line with other components (downhole tools) which also have a central passageway, thereby forming a substantially continuous passageway through the connected components.

The tools installed at the well may include, for example, a chemical injection pump that injects fluids into the well. Typically the fluids are injected in a pulsed manner, so the fluid pressure in the well (e.g., at the power generation module) increases and then decreases repeatedly at the frequency of the pulses of the chemical injection pump. The pressure of the fluid is communicated to a generating portion of the power generation module, where it causes components of the power generation module to move and thereby create changes in a generated voltage. For instance, the pressure may be applied to a set of movable charging blocks which move in sliding relation to a set of stationary charging blocks and thereby create a varying potential difference between the two sets of charging blocks. This generated potential difference is applied to the downhole tools, which then operate using the locally generated power. An exemplary embodiment is described in more detail below.

Figure 1:
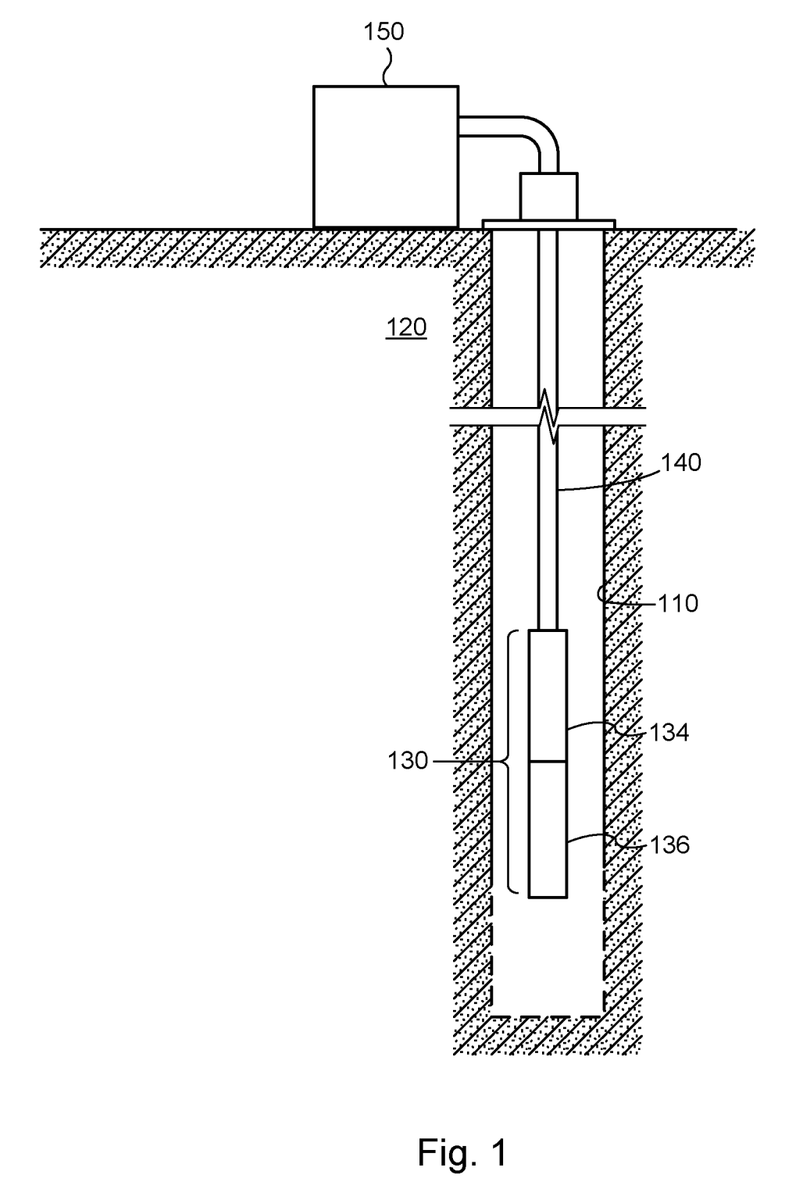
FIG. 1 is a diagram illustrating an exemplary system in accordance with one embodiment.
Figure 2:
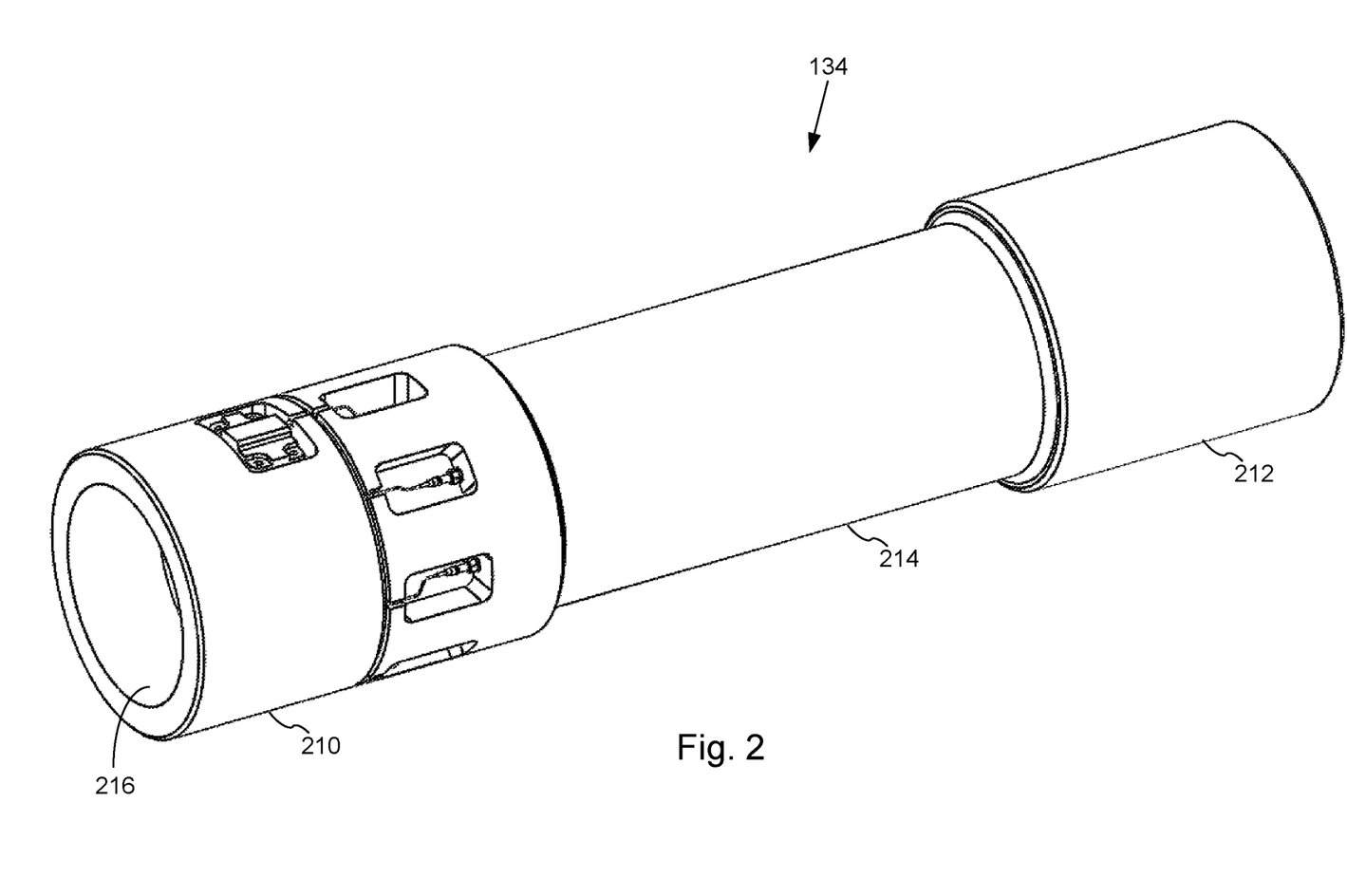
FIG. 2 is a diagram illustrating an exterior perspective view of an exemplary power generation module in accordance with one embodiment.

Referring to FIG. 1, a diagram illustrating an exemplary system in accordance with one embodiment of the present invention is shown. In this embodiment, a wellbore 110 is drilled into a geological structure 120. Commonly, a casing will be installed in the wellbore. A tool string 130 is coupled to the end of tubing 140 and is lowered into position downhole within the wellbore. The tool string may alternatively be coupled to a portion of the tubing other than the end (e.g., additional tubing may be coupled to the lower end of the tool string so that additional tools can be connected below the tool string). Additionally, alternative embodiments may use means other than tubing (e.g., a cable) to support the tool string. In some alternative embodiments, the tool string may be installed within the wellbore in such a manner that it does not require continued support from the tubing.

In this embodiment, string 130 includes a power generation module 134, and an electrically operated tool such as a gauge package 136. Power generation module 134 is electrically coupled to one or more of the other components of the tool string by cables or other appropriate conductors. For example, power generation module 134 is electrically coupled to gauge package 136. It may be coupled to other tools as well.

At the surface of the well, a chemical injection pump 150 is coupled to tubing 140. Chemical injection pump 150 injects fluids into the well through tubing 140. As the chemical injection pump pumps fluid into the well, it causes variations in the pressure of the fluid. Power generation module 134 is configured to autonomously generate power from the conditions present in the wellbore, and to provide the generated power to the other downhole tools. For instance, power generation module 134 may utilize the pressure variations in the well fluids in/around the module which result from the operation of the chemical injection pump to actuate power generating components within the module. The power generated by these components may be processed by circuitry within the power generation module (e.g., rectifier circuitry) before providing it to the other downhole tools.

Referring to FIGS. 2-5, a set of diagrams illustrating an exemplary power generation module are shown. In this embodiment, power generation module 134 has a generally cylindrical overall shape, with a pair of couplings 210, 212 connected to the ends of an outer shell 214. Couplings 210 and 212 are welded to outer shell 214 so that they form a single unit. Each of couplings 210 and 212 is generally annular and is internally threaded, so that it can be connected to the end of a tubing string or another tool. The outer diameter of the body, like any other downhole tool, is constrained by the dimensions of the wellbore within which the module will be used.

Figure 4:
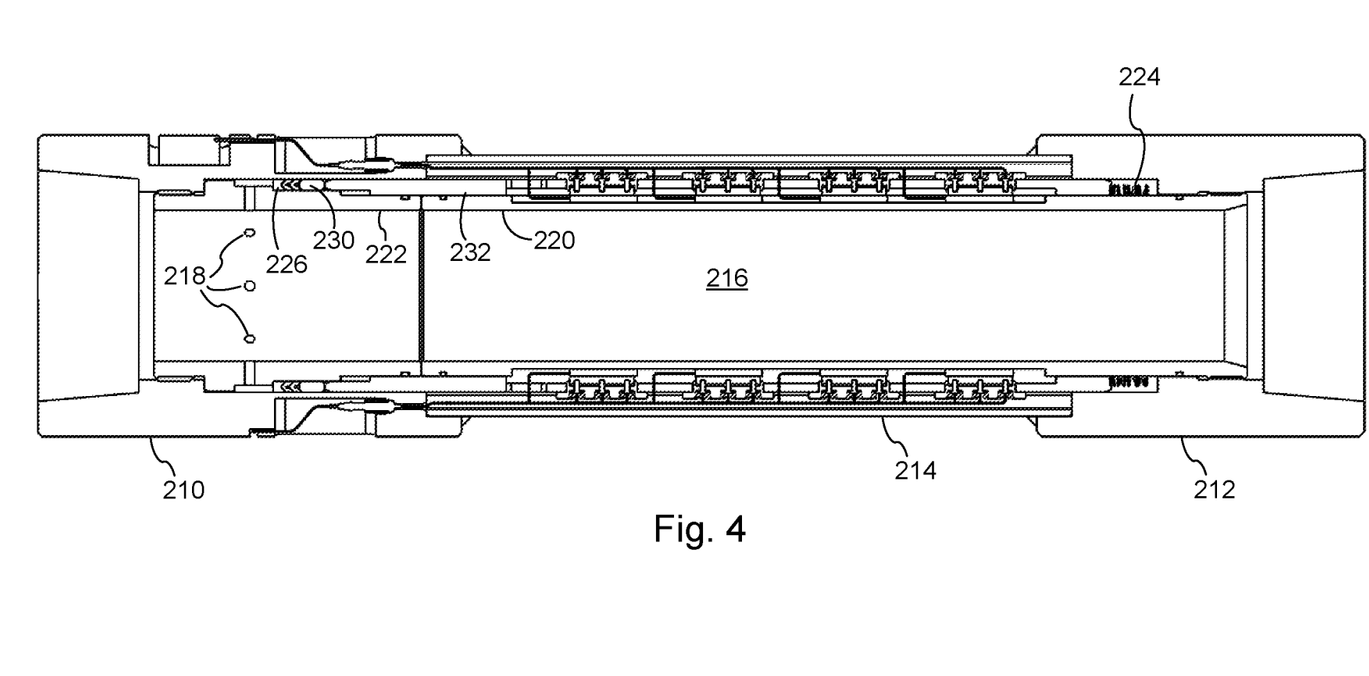
FIG. 4 is a diagram illustrating a cross-sectional view of an exemplary power generation module in accordance with one embodiment.

In this embodiment, a passageway 216 is formed through power generation module 134. The wall of the passageway is formed by an inner sleeve 220 and a retainer ring 222. Retainer ring 222 is secured to coupling 210, thereby holding inner sleeve 220 in place. A dynamic, sliding sleeve 232 is positioned between outer shell 214 and inner sleeve 220. A spring 224 is positioned between a first end of sliding sleeve 220 and coupling 212. When spring 224 is compressed, it urges sliding sleeve 220 away from coupling 212. At a second end of sliding sleeve 220 (opposite the first end of the sliding sleeve), there is a pressure chamber 226 formed between coupling 210 and retainer ring 222. Pressure chamber 226 is in fluid communication with passageway 216 via fluid ports 218. Fluid pressure within chamber 226 is applied to the second end of sliding sleeve 220, thereby urging the sliding sleeve away from coupling 210 and retainer ring 222. A seal 230 may be provided between pressure chamber 226 and sliding sleeve 232.

In this embodiment, the power generation module makes use of the triboelectric effect to produce an electric potential. In other words, charging blocks made of suitable are brought into contact with each other and, as the charging blocks are moved with respect to each other, the frictional contact between the blocks causes them to become electrically charged. In this case, a first set of charging blocks is mounted on sliding sleeve 232, while a second set of charging blocks is mounted on stationary inner sleeve 220. The first set of charging blocks is mounted on the sliding sleeve so that they maintain contact with the second set of charging blocks on the stationary sleeve.

The charging blocks of one set are made of a material that produces positive charge, while the other set of charging blocks are made of a material that produces negative charge. Exemplary Triboelectric materials are shown in Table 1 below. Preferably, the materials are selected to provide the greatest Triboelectric effect (i.e., are selected from opposite ends of the spectrum of available materials). In one embodiment, the material of the positive charging blocks may be glass or nylon, and the material of the negative charging blocks may be polytetrafluoroethylene (PTFE). The particular materials and the specific plate design for the charging blocks will be selected to maximize the charge density.

TABLE 1

| Exemplary Triboelectric materials (most positive to most negative) | |
| --- | --- |
| Most Positive (+) | |
| Air | + + + |
| Asbestos | |
| Glass | |
| Mica | |
| Nylon | |
| Lead | |
| Aluminum | + |
| Cotton | |
| Steel | − |
| Wood | |
| Lucite | |
| Amber | |
| Hard Rubber | |
| Mylar | |
| Nickel | |
| Copper | |
| Silver | |
| uv Resist | |
| Brass | − − − |
| Synthetic Rubber | |
| Gold, Platinum | |
| Sulfur | |
| Acetate, Rayon | |
| Polyester | |
| Celluloid | |
| Polystyrene | |
| Orlon, Acrylic | |
| Polyvinylidene chloride (Saran) | |
| Polyurethane | |
| Polyethylene | |
| Polypropylene | |
| Polyvinylchloride (Vinyl) | |
| Kel-F (PCTFE) | |
| Silicon | |
| Teflon | |
| Silicone Rubber | |
| Most Negative (−) | |

Figure 5:
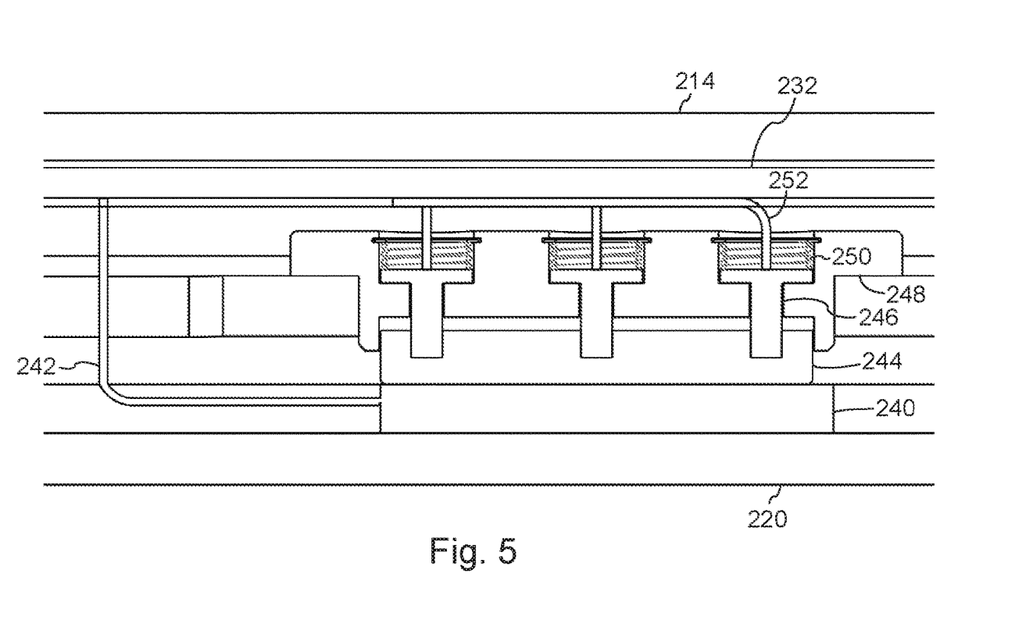
FIG. 5 is a diagram illustrating an exemplary configuration of the charging blocks of a power generation module in accordance with one embodiment.

Referring to FIG. 5, an exemplary configuration of the charging blocks is shown. In this example, the charging blocks of the second set (e.g., 240) are mounted in recesses in stationary inner sleeve 220 and are themselves stationary. A corresponding electrical conductor (e.g., wire) 242 is connected to each of these charging blocks. The charging blocks of the 1st set (e.g., 244) are movably mounted on sliding sleeve 232. More specifically, charging block 244 is mounted on a set of conductive pins (e.g., 246) that are mounted on a supporting block 248. Each of the conductive pins is movable in a radial direction (i.e., radially toward or away from the axis or centerline of the power generation module). Each conductive pin has a corresponding spring (e.g., 250) which urges the pin, and consequently the charging block, radially inward, toward the axis of the power generation module and toward the corresponding charging block of the 2nd set (240). This causes the movable charging block (244) to maintain contact with the stationary charging block (240), even if the contacting surfaces of the charging blocks wear down. An electrical conductor 252 is connected to one or more of the spring-loaded conductive pins.

Figure 3:
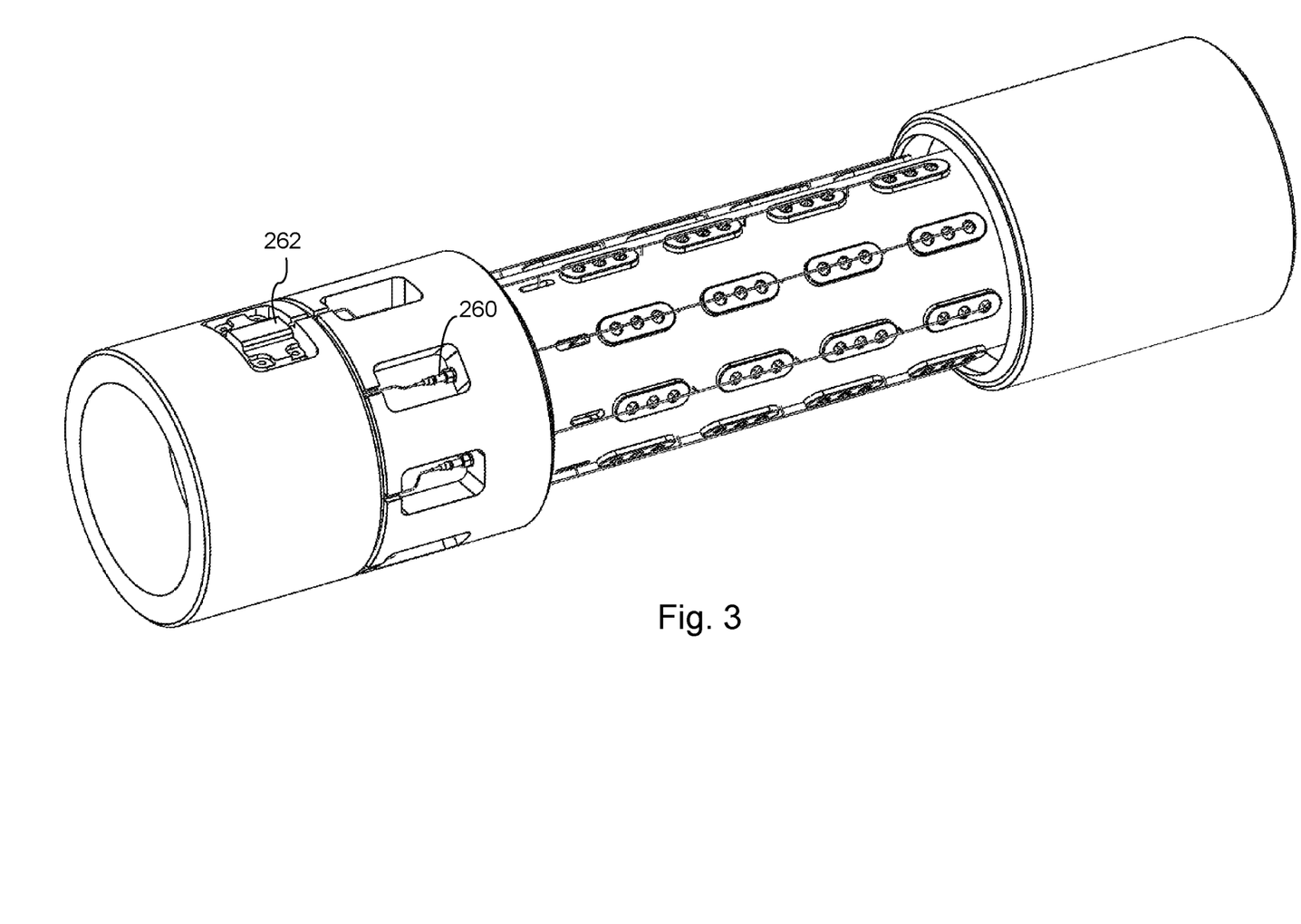
FIG. 3 is a diagram illustrating a perspective view of an exemplary power generation module with the outer shell removed.

Referring to FIG. 3, power generation module 134 is depicted with outer shell 214 removed. With the outer shell removed, the charging blocks mounted on the sliding sleeve are visible. It can be seen that there are multiple rows and columns of charging blocks that are mounted around the circumference of the sliding sleeve. A conductor is connected to pins at each of the charging blocks, and these conductors are connected to electrical terminals (e.g., 260) which pass through coupling 210. These pass-through terminals are positioned at recesses in the exterior of coupling 210, and conductors from each of these pass-through terminals are coupled to circuitry 262 which is positioned in another recess in the exterior of coupling 210. Circuitry 262 may collect and perform various processing on the power received from each of the charging blocks via the pass-through terminals. This processing may, for example, include rectifying or otherwise conditioning the received electrical signals. Circuitry 262 is coupled to one or more downhole tools and provides the collected and/or processed electrical power to these tools via suitable electrical conductors. Circuitry 262 may also include an energy storage device, such as a capacitor or battery that may store the energy received from the charging blocks until it is provided to one or more downhole tools. The stored energy can be used to provide instantaneous local power to move tools, activate events, stop events, and so on, without intervention from equipment at the surface of the well.

It should be noted that the outer shell is removed in FIG. 3 for purposes of illustrating the positions and interconnections of the charging blocks on the sliding sleeve, but the outer shell in this embodiment is normally permanently connected to the end couplings.

When fluid pressure in the wellbore increases, this increased pressure is communicated through fluid ports 218 to pressure chamber 226, causing sliding sleeve 232 to move away from the pressure chamber (to the right in the figures). Sliding sleeve 232 continues to move in this direction until the force applied by the fluid pressure in pressure chamber 226 is counterbalanced by the force of compressed spring 224. The characteristics of the spring will be selected based on the predicted range of fluid pressures so that the displacement of the charging blocks will be maximized. When the fluid pressure in the wellbore decreases, the decreased pressure is communicated to pressure chamber 226. Compressed spring 224 then causes sliding sleeve 232 to move toward pressure chamber 226 (to the left in the figures) until the forces of the spring and the fluid pressure in the chamber again equalize. Variations in the fluid pressure in the wellbore thereby cause sliding sleeve 232 to move in a reciprocating fashion, which in turn produces a time-varying voltage across the charging blocks.

Figure 6A:
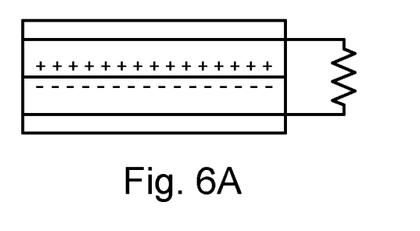
FIGS. 6A-6D are a set of diagrams illustrating the operation of a triboelectric generator in accordance with one embodiment.
Figure 6B:
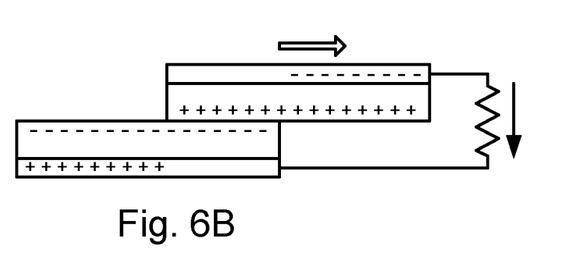
Figure 6C:
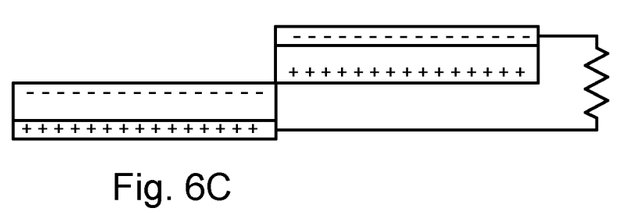
Figure 6D:
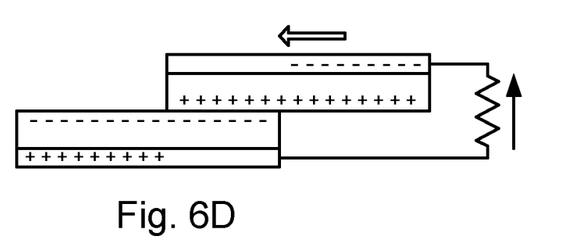

This is illustrated in FIGS. 6A-6D. These figures show a pair of charging blocks in four different positions. In FIG. 6A, the charging blocks are aligned. The upper charging block has an accumulation of positive charge, and the lower charging block has a corresponding accumulation of negative charge. No current is flowing through the load between the electrodes connected to the respective charging blocks. In FIG. 6B, the upper charging block is moved to the right of the lower charging block. This produces an imbalance in the charge and the resulting potential difference causes current to flow through the load. This continues until the upper charging block is completely displaced from the lower charging block as shown in FIG. 6C. The motion is the upper charging block is then reversed, and it is moved back toward alignment with the lower charging block as shown in FIG. 6D, causing current to flow in the opposite direction. The cycle then returns to the aligned position at FIG. 6A and repeats. It should be noted that the blocks need not be completely aligned or completely displaced in order to generate the potential differences and currents—the potential across the electrodes will generally be proportional to the displacement of the charging blocks.

As noted above, the power generation module may be used in conjunction with such tools as a chemical fluid injection pump. As the pump injects fluids into the well, it causes variations in the fluid pressure in the well. The fluid in the well is allowed to flow through the passageway in the center of the power generation module. From this passageway, the fluid pressure is communicated through the fluid ports to the pressure chamber in the power generation module. The pressure then moves the sliding sleeve and causes the charging blocks to generate an electric potential.

It should be noted that alternative embodiments may use types of generators other than a Triboelectric generator. For instance, one alternative embodiment uses a piezoelectric generator to create a potential difference. In this alternative embodiment, one or more piezoelectric crystals may be positioned adjacent to the pressure chamber so that the pressure of the fluids in the wellbore are applied to the piezoelectric crystals. This pressure causes the crystals to deform slightly, creating a potential difference across the crystals. As the fluid pressure varies, the potential difference varies. The resulting time-varying potential can be communicated to the rectifying circuitry and energy storage components in the same manner described above.

The benefits and advantages which may be provided by the present invention have been described above with regard to specific embodiments. These benefits and advantages, and any elements or limitations that may cause them to occur or to become more pronounced are not to be construed as critical, required, or essential features of any or all embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the description herein.

What is claimed is:

1. A downhole power generator module comprising:
    a body having one or more couplings that are configured to connect the body to a downhole tool string and positioned downhole in a wellbore;
    a pressure-driven electric generator positioned within the body;
    a port in the body that enables fluid communication of well fluids from the wellbore to the generator;

wherein pressure changes in the well fluids cause the generator to generate electric power;

wherein the generator comprises a triboelectric generator having a plurality of charging blocks, including a first set of the charging blocks and a second set of the charging blocks, wherein the first set of the charging blocks is in contact with and movable with respect to the second set of the charging blocks, wherein when the first set of the charging blocks moves with respect to the second set of the charging blocks, a voltage between the first set of the charging blocks with respect to the second set of the charging blocks changes, thereby producing an electric current.

2. The downhole power generator module of claim 1, wherein the first set of the charging blocks is mounted on a first, stationary sleeve within the body and the second set of the charging blocks is mounted on a second, movable sleeve within the body, wherein changes in the pressure of the well fluids cause the second sleeve and the second set of charging blocks to move with respect to the first sleeve and the first set of the charging blocks.

3. The downhole power generator module of claim 2, wherein for at least one of the first and second sleeve, the corresponding set of charging blocks is spring-mounted on the corresponding sleeve, wherein the spring-mounted set of charging blocks is movably mounted to maintain contact with the other set of charging blocks.

4. The downhole power generator module of claim 1, wherein the second set of the charging blocks comprise an array of individual charging blocks mounted on the second, movable sleeve, wherein the array comprises two or more circumferentially oriented rows and two or more axially oriented columns.

5. The downhole power generator module of claim 1, wherein either the first set of the charging blocks or the second set of the charging blocks comprises glass.

6. The downhole power generator module of claim 1, wherein either the first set of the charging blocks or the second set of the charging blocks comprises nylon.

7. The downhole power generator module of claim 1, wherein either the first set of the charging blocks or the second set of the charging blocks comprises polytetrafluoroethylene (PTFE).

8. The downhole power generator module of claim 1, wherein the first set of the charging blocks is mounted on a first, cylindrical sleeve within the body and the second set of the charging blocks is mounted on a second cylindrical sleeve within the body, wherein the first and second sleeves are coaxial with the outer housing, wherein the second sleeve is positioned within an annulus between the first sleeve and the outer housing, and wherein the second sleeve is movable with respect to the first sleeve and the outer housing.

9. The downhole power generator module of claim 8, further comprising a pressure chamber at a first end of the second sleeve, wherein a fluid communication port enables fluid communication between the pressure chamber and the passageway through the outer housing and couplings.

10. The downhole power generator module of claim 9, further comprising a spring positioned at a second end of the second sleeve opposite the first end of the second sleeve, wherein the spring urges the second sleeve toward the pressure chamber and wherein fluid pressure in the pressure chamber urges the second sleeve toward the spring.

* * * * *

UNITED STATES PATENT AND TRADEMARK OFFICE
CERTIFICATE OF CORRECTION

PATENT NO.        : 10,774,618 B2
APPLICATION NO.   : 15/923739
DATED             : September 15, 2020
INVENTOR(S)       : Loh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*